(12) United States Patent
Popov et al.

(10) Patent No.: US 10,427,068 B2
(45) Date of Patent: Oct. 1, 2019

(54) WATER DISTILLING AND PURIFYING UNIT AND VARIANTS THEREOF

(71) Applicants: Serguei A. Popov, Houston, TX (US); McKendree G. Pepper, Houston, TX (US)

(72) Inventors: Serguei A. Popov, Houston, TX (US); McKendree G. Pepper, Houston, TX (US)

( * ) Notice: Subject to any disclaimer, the term of this patent is extended or adjusted under 35 U.S.C. 154(b) by 8 days.

(21) Appl. No.: 15/841,368

(22) Filed: Dec. 14, 2017

(65) Prior Publication Data
US 2019/0184305 A1   Jun. 20, 2019

(51) Int. Cl.
*B01D 5/00* (2006.01)
*B01D 1/28* (2006.01)
*C02F 1/04* (2006.01)

(52) U.S. Cl.
CPC .......... *B01D 5/0039* (2013.01); *B01D 1/289* (2013.01); *B01D 5/006* (2013.01); *C02F 1/041* (2013.01); *C02F 2303/10* (2013.01)

(58) Field of Classification Search
CPC .......... B01D 3/10; B01D 3/007; B01D 3/101; B01D 3/14; B01D 1/00; B01D 3/105; B01D 1/0082; B01D 1/0094; B01D 1/06; B01D 1/289; B01D 3/065; B01D 3/42; B01D 53/18; B01D 5/0027; B01D 5/006; B01D 5/009; C10G 7/06; C10G 7/00; F04F 5/54; F04F 5/24; F04F 5/466; F04F 5/467; F04F 5/52; F25B 1/06; F25B 30/02

See application file for complete search history.

(56) References Cited

U.S. PATENT DOCUMENTS 7,328,591 B2 *   2/2008   Holtzapple ............ F04F 5/466
                                                            62/333

* cited by examiner

*Primary Examiner* — Sharon Pregler
(74) *Attorney, Agent, or Firm* — Richard A. Fagin

(57) ABSTRACT

A method for distilling water includes moving raw water into an evaporator. Water is pumped into a liquid-driven condensing ejector. Water vapor is discharged from a vapor outlet of the evaporator into a gas inlet of the ejector. Fluid from an outlet of the ejector is conducted into a heat exchanger. Heat from fluid conducted from the ejector is transferred in the heat exchanger to the raw water entering the evaporator.

10 Claims, 3 Drawing Sheets

WATER DISTILLING AND PURIFYING UNIT AND VARIANTS THEREOF

CROSS REFERENCE TO RELATED APPLICATIONS

Divisional of U.S. application Ser. No. 14/840,107 filed Aug. 31, 2015 and incorporated herein by reference in its entirety.

STATEMENT REGARDING FEDERALLY SPONSORED RESEARCH OF DEVELOPMENT

Not Applicable.

NAMES TO THE PARTIES TO A JOINT RESEARCH AGREEMENT

Not Applicable.

BACKGROUND

This disclosure is related to the field of water distillation technology, primarily as may be used in power generation, food production, civil engineering and construction, and other industrial applications.

An apparatus and a process for recovering lighter molecular weight components from a mixture of multiple molecular weight components different boiling points is disclosed in U.S. Pat. No. 7,328,591 issued to Holtzapple et al. The apparatus includes an evaporator drum, a liquid-driven condensing gas ejector, a separator, a heat exchanger, and a pump. The evaporator drum is connected by a vapor product conduit with the liquid-driven gas ejector. A discharge of the liquid-driven condensing gas ejector is connected with a separator. A vapor outlet of the separator is connected to heat exchangers. A liquid product outlet of the separator is connected to a pump. The heat exchanger conducts its heat to a medium in the evaporator drum medium.

The process implemented by the apparatus disclosed in the '591 patent may have a low energy efficiency.

DETAILED DESCRIPTION

Figure 1:
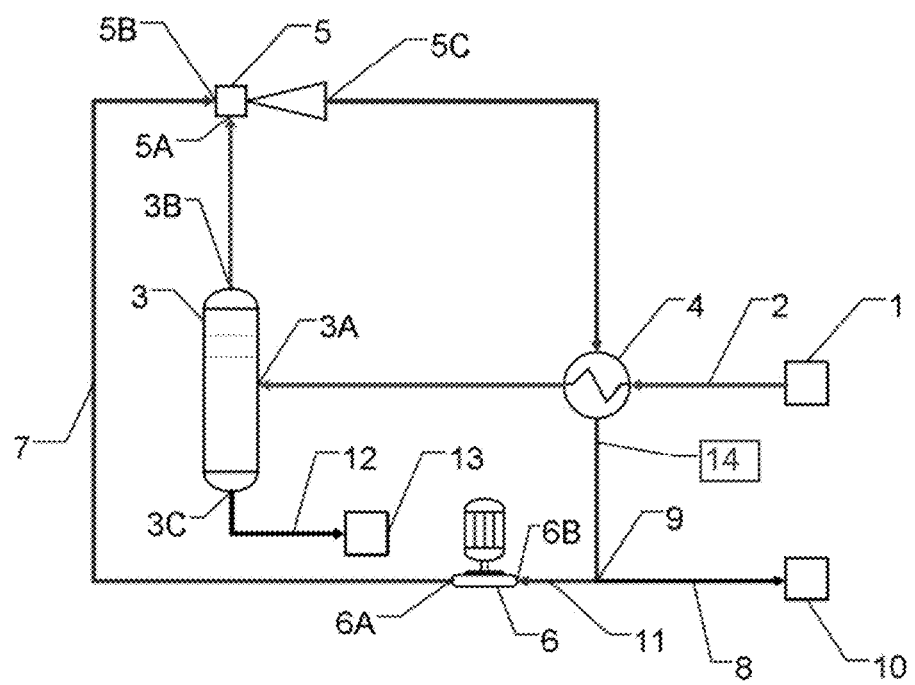
FIG. 1 is a schematic diagram of an example embodiment of a water distillation and purification unit.

Various embodiments of a water distillation and purifying unit according to the present disclosure may have higher energy efficiency and operational reliability. The foregoing may be obtained by combining water vapor compression and condensation in a liquid driven condensing ejector using water as the motive fluid, and separating purified water from the raw feed water, with an extend in control range of its operational benefits.

Various embodiments of a water distillation and purifying unit according to the disclosure may include a liquid-driven condensing ejector, a separator, a heat exchanger, an evaporator and a pump. Liquid outlet from the pump is connected to the motive fluid inlet of a liquid-driven condensing ejector ("condensing ejector"). A liquid outlet of the condensing ejector is connected to an intake of the pump through a heat exchanger. Raw feed to the evaporator is supplied through the heat exchanger to act as a cooling medium for water leaving the condensing ejector.

To enable sufficient heat transfer to cool the pump-circulated water and to heat the raw intake water before it is fed to the evaporator, in some embodiments the circulated water is maintained at a temperature higher than the evaporator inlet temperature. The temperature differential may be in a range from 0.1° F. to 400° F. The range has been established through experiments as being practical. The increased efficiency may be obtained wherein heat of condensation induced by condensing water vapor in the condensing ejector is absorbed by the pump-circulated water, and this heat is transferred in the heat exchanger to the raw water intake.

In some embodiments, pressure in the evaporator may be controlled by the condensing ejector to maintain the evaporator temperature from 60° F. to 370° F. above the pump circulated water temperature, e.g., at the liquid inlet of the condensing ejector, by increasing or reducing fluid flow rate through the condensing ejector. This also increases efficiency of water extraction from the raw water intake and reduces the amount of waste discharged from the evaporator.

In some embodiments, a purified water takeoff, or "tee", may be located downstream of the heat exchanger to draw off part of the pump-circulated water as a product to maintain the pump-circulated water balance.

In some embodiments, an accumulator can be installed between the condensing ejector and the heat exchanger. In some embodiments, noncondensible vapors may be drawn from the top of the accumulator if noncondensible gasses are present in the raw water intake.

In some embodiments, the condensing ejector may be installed inside an accumulator.

In some embodiments, a heat exchanger can be located inside the evaporator.

Experiments have demonstrated that a water distilling and purifying unit as described above may have near isothermal compression, full condensation of the compressed vapors, and absorption of the heat of condensation by recirculating liquid allow use of the heat of condensation to pre-heat the raw water intake.

FIG. 1 is a schematic diagram of an example embodiment of a water distillation and purification unit. Raw water is input through in intake conduit (2) from an outside source (1). The raw water conduit (2) is in fluid communication with an inlet port (3A) of an evaporator (3) through a heat exchanger (4). A vapor outlet port (3B) of the evaporator (3) is connected to a gas inlet port (5A) of liquid-driven condensing ejector ("ejector") (5). The ejector liquid inlet port (5B) is in fluid communication with an outlet port (6A) of a pump (6) to supply a circulating liquid motive fluid in a motive fluid loop (7) to the ejector (5). The ejector discharge port (5C) is in fluid communication with an inlet of the heat exchanger (4). An outlet of the heat exchanger (4) is in fluid communication with the inlet port (6B) of the pump (6) through a heat exchanger outlet conduit 14. In the present embodiment, part of the purified liquid water product (8) leaving the heat exchanger (4) may be drawn from a "tee" (9) and sent to outside consumers (10). Another part of the purified liquid water (11) is communicated to the intake (6B) of the pump (6). Concentrated waste product (12) may be drawn from the bottom of the evaporator (3) through a waste port (3C) and sent to outside consumers (13) for further handling and utilization.

Figure 2:
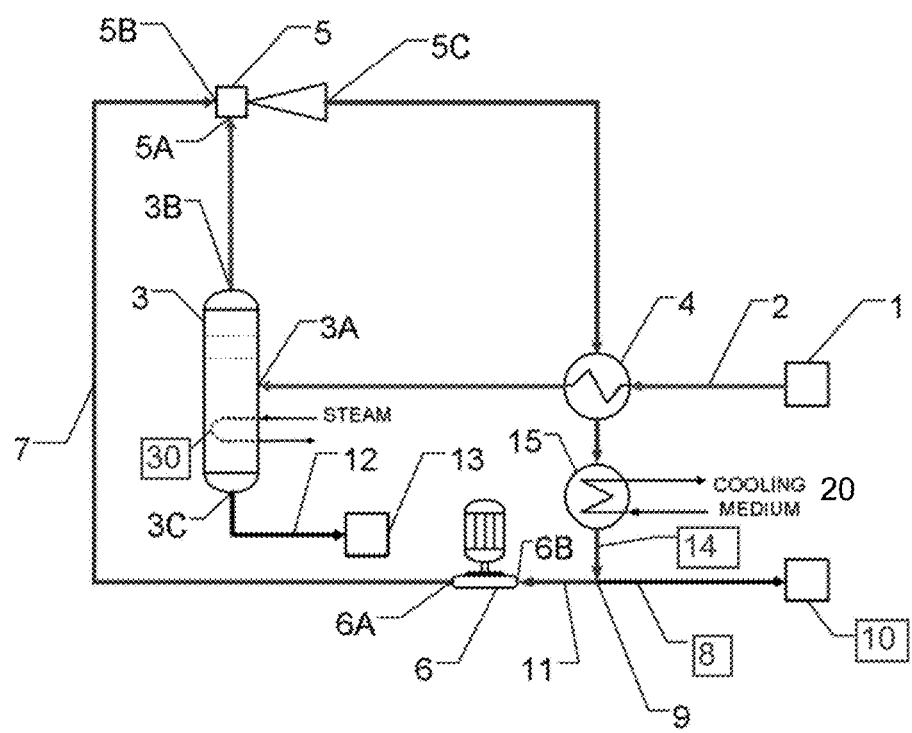
FIG. 2 is a schematic diagram of an example embodiment as in FIG. 1 and with a standalone heat exchanger.

FIG. 2 is a schematic diagram of the described energy efficient distilling heat pump with a secondary, standalone heat exchanger. Raw water is input through in intake conduit (2) from an outside source (1). The raw water conduit (2) is in fluid communication with an inlet port (3A) of an evaporator (3) through a primary heat exchanger (4). A vapor outlet port (3B) of the evaporator (3) is connected to a gas inlet port (5A) of liquid-driven condensing ejector ("ejector") (5). The ejector liquid inlet port (5B) is in fluid communication with an outlet port (6A) of a pump (6) to supply a circulating liquid motive fluid in a motive fluid loop (7) to the ejector (5). The ejector discharge port (5C) is in fluid communication with an inlet of the primary heat exchanger (4). An outlet of the heat exchanger (4) is in fluid communication with the inlet port (6B) of the pump (6) through a heat exchanger outlet conduit 14. In the present embodiment, part of the purified liquid water product (8) leaving the primary heat exchanger (4) may be drawn from a "tee" (9) and sent to outside consumers (10). Another part of the purified liquid water (11) is communicated to the intake (6B) of the pump (6). Concentrated waste product (12) may be drawn from the bottom of the evaporator (3) through a waste port (3C) and sent to outside consumers (13) for further handling and utilization. In the example embodiment of FIG. 2, a heater (30) may be included in the evaporator (3) to introduce additional heat to boil the intake water. Motive circulating water discharged from the primary heat exchanger (4) may pass through a secondary heat exchanger (15). The secondary heat exchanger (15) may use a cooling fluid (20), i.e., one having a temperature lower than the temperature of the liquid leaving the primary heat exchanger (4), to further cool and condense the liquid discharged from the primary heat exchanger (4) on its way to the intake (6B) of the pump (6).

Figure 3:
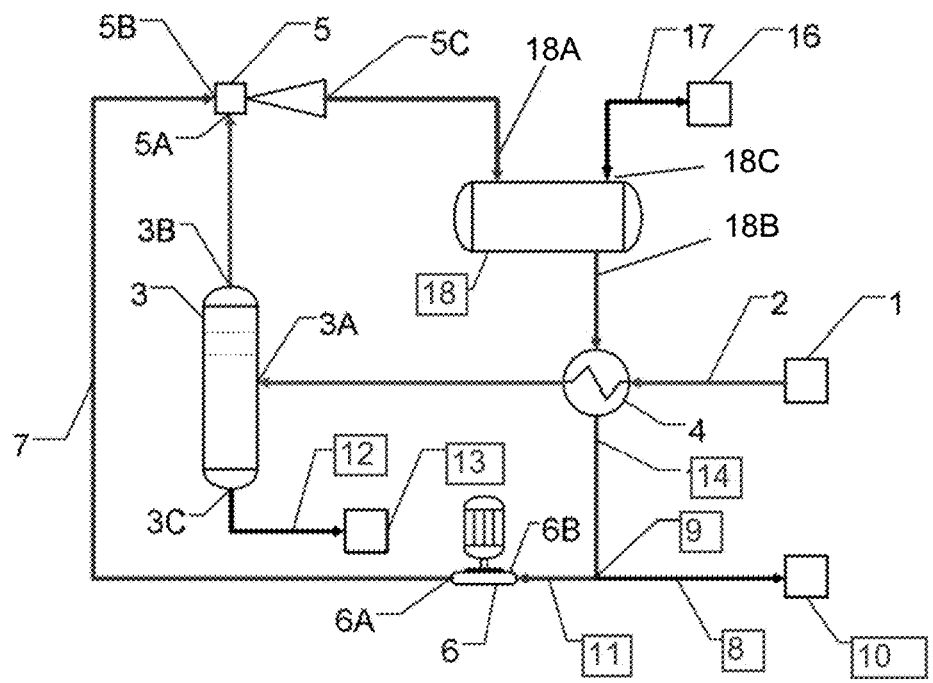
FIG. 3 is a schematic diagram of an example embodiment which includes an accumulator.

FIG. 3 is a schematic diagram of another example embodiment of a water distillation and purification unit which includes an accumulator. Raw water is input through in intake conduit (2) from an outside source (1). The raw water conduit (2) is in fluid communication with an inlet port (3A) of an evaporator (3) through a heat exchanger (4). A vapor outlet port (3B) of the evaporator (3) is connected to a gas inlet port (5A) of liquid-driven condensing ejector ("ejector") (5). The ejector liquid inlet port (5B) is in fluid communication with an outlet port (6A) of a pump (6) to supply a circulating liquid motive fluid in a motive fluid loop (7) to the ejector (5). The ejector discharge port (5C) is in fluid communication with an inlet of the heat exchanger (4). An outlet of the heat exchanger (4) is in fluid communication with the inlet port (6B) of the pump (6) through a heat exchanger outlet conduit (14). In the present embodiment, part of the purified liquid water product (8) leaving the heat exchanger (4) may be drawn from a "tee" (9) and sent to outside consumers (10). Another part of the purified liquid water (11) is communicated to the intake (6B) of the pump (6). Concentrated waste product (12) may be drawn from the bottom of the evaporator (3) through a waste port (3C) and sent to outside consumers (13) for further handling and utilization.

In the present embodiment, the ejector discharge port (5C) is in fluid communication with an inlet (18A) of an accumulator (18) to ensure safe pump operation. A liquid outlet (18B) of the accumulator (8) is in fluid communication with the intake (6B) of the pump (6) through the heat exchanger (4). The accumulator (8) may be exposed to the atmosphere (16) through line (17) in fluid communication with an upper part (18C) of the accumulator (18) to control pressure in the accumulator (8).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for distilling water, comprising:
   moving raw water into an evaporator;
   pumping water into a liquid-driven condensing ejector;
   discharging water vapor from a vapor outlet of the evaporator into a gas inlet of the condensing ejector;
   condensing the water vapor into liquid in the ejector
   conducting fluid from an outlet of the ejector into a heat exchanger; and
   transferring heat from fluid conducted from the condensing ejector in the heat exchanger to the raw water entering the evaporator, wherein the fluid conducted from the condensing ejector that is pumped into the liquid-driven jet ejector as motive fluid is cooled in the heat exchanger.

2. The method of claim 1 further comprising conducting at least part of fluid discharged from the heat exchanger to an external consumer.

3. The method of claim 1 further comprising conducting water discharged from the condensing ejector to an accumulator.

4. The method of claim 3 further comprising conducting vapor in an upper part of the accumulator to the atmosphere.

5. The method of claim 3 further comprising conducting liquid water from the accumulator to the heat exchanger.

6. The method of claim 1 wherein water at an inlet to the heat exchanger is maintained at a temperature higher than raw water.

7. The method of claim 1 wherein the water temperature at the inlet to the heat exchanger is in a range from 0.1° F. to 400° F. higher than the raw water temperature.

8. The method of claim 1 further comprising maintaining a temperature in the evaporator in a range from 60° F. to 370° F. above the temperature of the water at an inlet of the condensing ejector by controlling fluid flow rate through the ejector.

9. The method of claim 1 further comprising adding heat to an interior of the evaporator.

10. The method of claim 1 further comprising cooling fluid discharged from the heat exchanger prior to entering an intake of a pump used to pump water into the condensing ejector.

* * * * *